(12) United States Patent  
Oguro et al.

(10) Patent No.: US 11,310,456 B2  
(45) Date of Patent: Apr. 19, 2022

(54) PHOTOELECTRIC CONVERSION DEVICE AND IMAGING SYSTEM

(71) Applicant: CANON KABUSHIKI KAISHA, Tokyo (JP)

(72) Inventors: Yasuhiro Oguro, Tokyo (JP); Takanori Yamashita, Hachioji (JP); Tomoya Kumagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 17/075,306

(22) Filed: Oct. 20, 2020

(65) Prior Publication Data

US 2021/0136305 A1 May 6, 2021

(30) Foreign Application Priority Data

Oct. 30, 2019 (JP) .............................. JP2019-197632

(51) Int. Cl.  
*H04N 5/378* (2011.01)  
*G06T 7/50* (2017.01)

(52) U.S. Cl.  
CPC ............... *H04N 5/378* (2013.01); *G06T 7/50* (2017.01)

(58) Field of Classification Search  
CPC .................................. H04N 5/378; G06T 7/50  
See application file for complete search history.

(56) References Cited

U.S. PATENT DOCUMENTS

| 2002/0000924 | A1* | 1/2002 | Sarraj | G11C 27/026 341/122 |
| 2009/0167915 | A1 | 7/2009 | Hirota | |
| 2017/0171483 | A1* | 6/2017 | Ku | H04N 5/378 |
| 2018/0220089 | A1* | 8/2018 | Sakuragi | H04N 5/379 |
| 2019/0349540 | A1* | 11/2019 | Yamashita | H04N 5/378 |

FOREIGN PATENT DOCUMENTS

| JP | 2009177797 A | 8/2009 |
| JP | 2010011426 A | 1/2010 |
| WO | 2011151947 A | 12/2011 |

* cited by examiner

*Primary Examiner* — Michael E Teitelbaum  
(74) *Attorney, Agent, or Firm* — Canon U.S.A., Inc. IP Division

(57) ABSTRACT

A photoelectric conversion device includes pixels forming columns, an amplifier, signal holding capacitors, switches, and a control unit. The pixels forming columns are configured to amplify, at multiple gains, a signal based on charge generated by a photoelectric converter of the pixel. The signal holding capacitors are provided in association with the columns. The switches control sample-and-hold operations to the signal holding capacitors on corresponding columns. The control unit supplies a control signal that controls the switches. The control unit supplies the control signal whose settling time when the switches transition from an on-state to an off-state is a first length and a second length when the signal amplified at a first gain and a second gain, respectively, is held in the signal holding capacitor. The second gain is higher than the first gain.

16 Claims, 8 Drawing Sheets

PHOTOELECTRIC CONVERSION DEVICE AND IMAGING SYSTEM

BACKGROUND

Technical Field

One disclosed aspect of the embodiments relates to a photoelectric conversion device and an imaging system.

Description of the Related Art

Japanese Patent Application Laid-Open No. 2010-011426 discloses a drive method for a sampling switch when holding a pixel signal in a signal holding unit. Specifically, the waveform of a control signal is controlled such that a rate of change of the amplitude of a control signal used for controlling a sampling switch from a conductive state to a nonconductive state is smaller than a rate of change of the amplitude of a control signal used for driving the sampling switch from a nonconductive state to a conductive state. With such control of the waveform of a control signal of a sampling switch, the variation of an offset component superimposed on a pixel signal held in a signal holding unit on each column may be suppressed to be smaller variation, and image quality may be improved.

When a pixel signal is amplified, however, a longer time is required until the signal is settled compared to a case where the pixel signal is not amplified. Thus, when a pixel signal amplified by using the method of Japanese Patent Application Laid-Open No. 2010-011426 is held in a signal holding unit, the rate of change of the amplitude of a control signal is required to be further reduced compared to the case where a not-amplified pixel signal is held in the signal holding unit, and readout time of the signal may increase.

SUMMARY

One disclosed aspect of the embodiments provides a photoelectric conversion device and an imaging system that may suppress variation of an offset component superimposed on a pixel signal and improve image quality without increasing readout time even when the pixel signal is amplified.

According to one aspect of the embodiments, a photoelectric conversion device includes a plurality of pixels, an amplifier unit, a plurality of signal holding capacitors, a plurality of switches, and a control unit. The plurality of pixels is arranged to form a plurality of rows and a plurality of columns each including a photoelectric converter. The amplifier unit, or amplifier or amplifier circuit, is configured to amplify, at a plurality of gains, a signal in accordance with an amount of charge generated by the photoelectric converter of each of the pixels. The plurality of signal holding capacitors is provided in association with the plurality of columns and each configured to hold the signal amplified by the amplifier unit. The plurality of switches is provided in association with the plurality of columns and each configured to control a sample-and-hold operation of the signal to each of the signal holding capacitors on a corresponding column. The control unit, or controller or control circuit, supplies a control signal that controls operations of the plurality of switches. The control unit supplies the control signal whose settling time when the plurality of switches transition from an on-state to an off-state is a first length when the signal amplified by the amplifier unit at a first gain is held in each of the signal holding capacitors. The control unit supplies the control signal whose settling time when the plurality of switches transition from an on-state to an off-state is a second length, which is shorter than the first length, when the signal amplified by the amplifier unit at a second gain, which is higher than the first gain, is held in each of the signal holding capacitors.

Further, according to another aspect of the embodiments, provided is a method of driving a photoelectric conversion device. The photoelectric conversion device includes a plurality of pixels, an amplifier unit, a plurality of signal holding capacitors, and a plurality of switches. The plurality of pixels is arranged to form a plurality of rows and a plurality of columns and each including a photoelectric converter. The amplifier unit, or amplifier or amplifier circuit, is configured to amplify, at a plurality of gains, a signal in accordance with an amount of charge generated by the photoelectric converter of each of the pixels. The plurality of signal holding capacitors is provided in association with the plurality of columns and each configured to hold the signal amplified by the amplifier unit. The plurality of switches is provided in association with the plurality of columns and each configured to control a sample-and-hold operation of the signal to each of the signal holding capacitors on a corresponding column. The method includes a first driving and a second driving. The first driving drives the plurality of switches by the control signal whose settling time when the plurality of switches transition from an on-state to an off-state is a first length when the signal amplified by the amplifier unit at a first gain is held in each of the signal holding capacitors. The second driving drives the plurality of switches by the control signal whose settling time when the plurality of switches transition from an on-state to an off-state is a second length, which is shorter than the first length, when the signal amplified by the amplifier unit at a second gain, which is higher than the first gain, is held in each of the signal holding capacitors.

Further features of the disclosure will become apparent from the following description of exemplary embodiments with reference to the attached drawings.

DESCRIPTION OF THE EMBODIMENTS

Preferred embodiments of the disclosure will now be described in detail in accordance with the accompanying drawings.

First Embodiment

Figure 1:
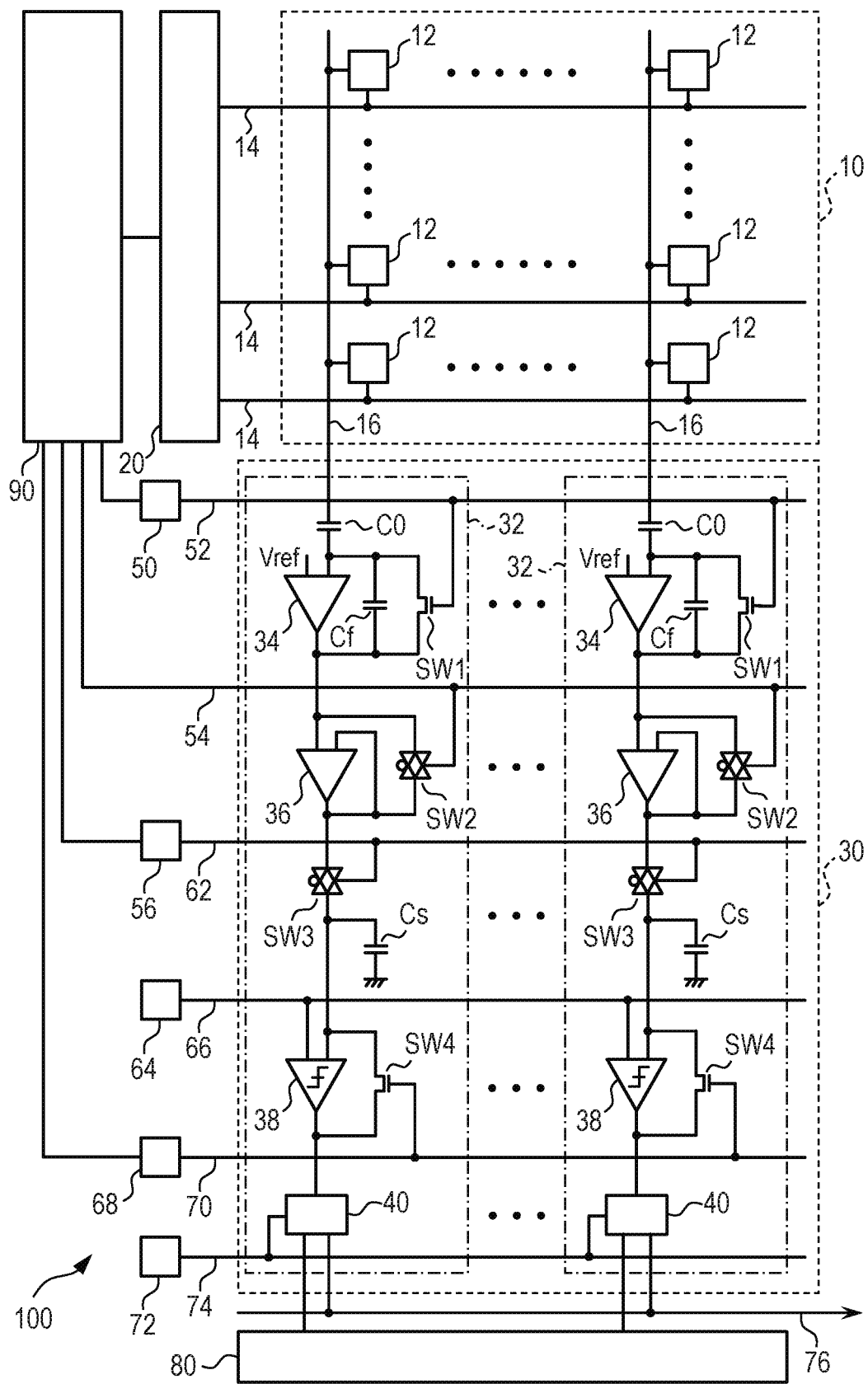
FIG. 1 is a diagram illustrating a general configuration of a photoelectric conversion device according to a first embodiment.

The general configuration of a photoelectric conversion device according to a first embodiment will be described with reference to FIG. 1. FIG. 1 is a diagram illustrating the general configuration of the photoelectric conversion device according to the present embodiment.

As illustrated in FIG. 1, a photoelectric conversion device 100 includes a pixel region 10, a vertical scanning circuit 20, a readout circuit unit 30, a horizontal scanning circuit 80, and a timing generator 90. In addition, the photoelectric conversion device 100 further includes waveform control circuits 50, 56, and 68, a reference signal generation circuit 64, and a counter 72.

In the pixel region 10, a plurality of pixels 12 is arranged in a matrix so as to form a plurality of rows and a plurality of columns. Each of the pixels 12 includes a photoelectric converter formed of a photoelectric conversion element such as a photodiode and has a function of outputting a pixel signal in accordance with a light amount of incident light. The number of rows and the number of columns in a pixel array arranged in the pixel region 10 are not particularly limited. Further, in the pixel region 10, in addition to effective pixels that output pixel signals in accordance with a light amount of incident light, an optical black pixel in which the photoelectric converter is shielded from light, a dummy pixel that does not output any signal, or the like may be arranged.

On each row of the pixel array of the pixel region 10, a control line 14 is arranged extending in a first direction (horizontal direction in FIG. 1). Each control line 14 is connected to the pixels 12 arranged in the first direction, respectively, to form a signal line common to these pixels 12. The first direction in which the control line 14 extends may be referred to as a row direction or a horizontal direction. The control lines 14 are connected to the vertical scanning circuit 20.

The vertical scanning circuit 20 is a control circuit unit that supplies, to the pixels 12 via the control lines 14 provided on respective rows of the pixel array, control signals used for driving readout circuits in the pixels 12 when reading out signals from the pixels 12. The vertical scanning circuit 20 may be formed by using a shift register or an address decoder.

On each column of the pixel array of the pixel region 10, an output line 16 is arranged extending in a second direction (vertical direction in FIG. 1) intersecting the first direction. Each output line 16 is connected to the pixels 12 arranged in the second direction, respectively, to form a signal line common to these pixels 12. The second direction in which the output line 16 extends may be referred to as a column direction or a vertical direction. The output lines 16 are connected to the readout circuit unit 30.

The readout circuit unit 30 is a processing circuit unit that performs signal processing such as an amplification process or an AD conversion process on pixel signals output from the pixels 12 on respective columns of the pixel region 10 via the output lines 16. The readout circuit unit 30 includes a plurality of column circuits 32 provided in association with respective columns of the pixel region 10. Each of the column circuits 32 includes amplifiers 34 and 36, a comparator 38, a memory 40, an input capacitor C0, a feedback capacitor Cf, a signal holding capacitor Cs, and switches SW1, SW2, SW3, and SW4.

The amplifier 34 may be formed of a differential amplifier circuit or a common source amplifier circuit. FIG. 1 illustrates a differential amplifier circuit having two input terminals and one output terminal as an example of the amplifier 34. One input terminal (for example, an inverting input terminal) of the amplifier 34 is connected to the output line 16 on a corresponding column via the input capacitor C0. Further, the feedback capacitor Cf is connected between the one input terminal and the output terminal of the amplifier 34. Further, the switch SW1 used for resetting the amplifier 34 is connected between the one input terminal and the output terminal of the amplifier 34. A reference voltage Vref is supplied to the other input terminal (for example, a noninverting input terminal) of the amplifier 34.

The amplifier 36 may be formed of a differential amplifier circuit. FIG. 1 illustrates a differential amplifier circuit having two input terminals and one output terminal as an example of the amplifier 36. One input terminal (for example, a noninverting input terminal) of the amplifier 36 is connected to the output terminal of the amplifier 34. The switch SW2 is connected between the one input terminal and the output terminal of the amplifier 36. Further, the other input terminal (for example, an inverting input terminal) and the output terminal of the amplifier 36 are short-circuited. Thereby, the amplifier 36 forms a voltage follower circuit.

The amplifiers 34 and 36 form a column amplifier unit that can amplify, at a plurality of gains, a pixel signal output from the pixel 12, that is, a signal in accordance with an amount of charge generated by the photoelectric converter of the pixel 12.

The comparator 38 may be formed of a differential pair circuit. FIG. 1 illustrates a differential pair circuit having two input terminals and one output terminal as an example of the comparator 38. One input terminal of the comparator 38 is connected to the output terminal of the amplifier 36 via the switch SW3. The switch SW4 used for resetting the comparator 38 is connected between the one input terminal and the output terminal of the comparator 38. The signal holding capacitor Cs is connected to the connection node between the switch SW3 and the one input terminal of the comparator 38. The other input terminal of the comparator 38 is connected to the reference signal generation circuit 64 via a reference signal line 66. The output terminal of the comparator 38 is connected to the memory 40.

Each of the switches SW1, SW2, SW3, and SW4 may be formed of a metal oxide semiconductor (MOS) transistor, for example. When the switches SW1, SW2, SW3, and SW4 are formed of n-channel MOS transistors, each of the switches SW1, SW2, SW3, and SW4 is turned on (or is in a conductive state) when a high level control signal is supplied to each control node (or gate). Further, each of the switches SW1, SW2, SW3, and SW4 is turned off (or is in a nonconductive state) when a low level control signal is supplied to each control node (or gate). When the switches SW1, SW2, SW3, and SW4 are formed of p-channel MOS transistors, the signal levels of the control signals are opposite. Note that, in the present embodiment, description will be provided assuming that the switches SW1, SW2, SW3, and SW4 are formed of n-channel MOS transistors.

The counter 72 is connected to the memory 40 of the column circuit 32 on each column via the control line 74. Further, the horizontal scanning circuit 80 is connected to the memory 40 of the column circuit 32 on each column. The output terminal of the memory 40 of the column circuit 32 on each column is connected to a horizontal output line 76.

The timing generator 90 is a control unit that supplies, to the vertical scanning circuit 20, the waveform control circuits 50, 56, and 68, the reference signal generation circuit 64, the counter 72, and the horizontal scanning circuit 80, control signals that control operations or the timing of the operations of these components.

The waveform control circuit 50 is connected to the control node of the switch SW1 of the column circuit 32 on each column via a control line 52. The timing generator 90 is connected to the waveform control circuit 50. The switch SW1 of the column circuit 32 on each column is controlled by a control signal PC0R supplied from the waveform control circuit 50 via the control line 52 under the control of the timing generator 90.

The timing generator 90 is connected to the control node of the switch SW2 of the column circuit 32 on each column via a control line 54. The switch SW2 of the column circuit 32 on each column is controlled by a control signal PVFTH supplied from the timing generator 90 via the control line 54.

The waveform control circuit 56 is connected to the control node of the switch SW3 of the column circuit 32 on each column via a control line 62. The timing generator 90 is connected to the waveform control circuit 56. The switch SW3 of the column circuit 32 on each column is controlled by a control signal PSH supplied from the waveform control circuit 56 via the control line 62 under the control of the timing generator 90.

The waveform control circuit 68 is connected to the control node of the switch SW4 of the column circuit 32 on each column via a control line 70. The timing generator 90 is connected to the waveform control circuit 68. The switch SW4 of the column circuit 32 on each column is controlled by a control signal PCR supplied from the waveform control circuit 68 via the control line 70 under the control of the timing generator 90.

Note that, although not explicitly illustrated in FIG. 1, the reference signal generation circuit 64, the counter 72, and the horizontal scanning circuit 80 may be controlled by the timing generator 90 as well. Note that at least some of the control signals supplied to the vertical scanning circuit 20, the waveform control circuits 50, 56, and 68, the reference signal generation circuit 64, the counter 72, and the horizontal scanning circuit 80 may be supplied from the outside of the photoelectric conversion device 100.

Next, an outline of the operation of the photoelectric conversion device according to the present embodiment will be described with reference to FIG. 1. The plurality of pixels 12 forming the pixel region 10 are controlled on a row basis by control signals supplied from the vertical scanning circuit 20 via the control lines 14 under the control of the timing generator 90. Thereby, each of the pixels 12 belonging to a row selected by the vertical scanning circuit 20 outputs a pixel signal in accordance with a light amount of incident light to the output line 16 on a corresponding column. The pixel signal output from the pixel 12 via the output line 16 is input to the column circuit 32 on a corresponding column.

The pixel signal input to each column circuit 32 is amplified by the amplifier 34 at an amplification factor in accordance with a capacitance ratio (C0/Cf) of the input capacitance C0 and the feedback capacitance Cf. The pixel signal amplified by the amplifier 34 is further amplified by the amplifier 36 and held in the signal holding capacitor Cs.

The comparator 38 performs a comparison operation to compare the level of a pixel signal held in the signal holding capacitor Cs with the level of a reference signal supplied from the reference signal generation circuit 64 and outputs a latch signal at a timing when the relationship of these levels is inverted. A count signal supplied from the counter 72 and an output signal of the comparator 38 are input to the memory 40. The memory 40 stores, as digital data of a pixel signal, the count value indicated by a count signal at a timing when a latch signal is received from the comparator 38.

The horizontal scanning circuit 80 outputs control signals to the memories 40 of the column circuits 32 sequentially on respective columns under the control of the timing generator 90. The memory 40 that has received a control signal from the horizontal scanning circuit 80 outputs digital data digitally converted from a pixel signal to the horizontal output line 76.

The column circuit 32 on each column forming the readout circuit unit 30 is controlled by the control signals PC0R, PVFTH, PSH, and PCR.

The control signal PC0R is a control signal to drive the switch SW1 that controls a reset operation of the amplifier 34. The control signal PC0R is supplied to the control node of the switch SW1 to control the connection state (conductive/nonconductive) of the switch SW1. For example, when the control signal PC0R is controlled to the high level and the switch SW1 is turned on, the input terminal and the output terminal of the amplifier 34 are short-circuited, and the pixel signal is clamped at the reference voltage Vref.

The control signal PVFTH is a control signal to drive the switch SW2 that selects whether or not to use the amplifier 36. The control signal PVFTH is supplied to a control node of the switch SW2 to control the connection state of the switch SW2 (conductive/nonconductive). For example, when the control signal PVFTH is controlled to the high level and the switch SW2 is turned on, the input terminal and the output terminal of the amplifier 36 are short-circuited, and a signal path not using the amplifier 36 is formed.

The control signal PSH is a control signal to drive the switch SW3 that controls a sample-and-hold operation of a pixel signal to the signal holding capacitor Cs. The control signal PSH is supplied to the control node of the switch SW3 to control the connection state of the switch SW3 (conductive/nonconductive). For example, in a period in which the control signal PSH is at the high level, the switch SW3 is in an on-state, and a pixel signal is sampled in the signal holding capacitor Cs. Further, in a period in which the control signal PSH is at the low level, the switch SW3 is in an off-state, and a pixel signal is held in the signal holding capacitor Cs.

The control signal PCR is a control signal to drive the switch SW4 that controls a reset operation of the comparator 38. The control signal PCR is supplied to the control node of the switch SW4 to control the connection state of the switch SW4 (conductive/nonconductive). For example, when the control signal PCR is controlled to the high level and the switch SW4 is turned on, the input terminal and output terminal of the comparator 38 are short-circuited, and the comparator 38 is reset.

Herein, each of these control signals to control the readout circuit unit 30 is supplied from one side (the left side in FIG. 1) of the readout circuit unit 30 to the column circuit 32 on each column via a common control line. Specifically, the control signal PC0R supplied from the waveform control circuit 50 is supplied to the switch SW1 of the column circuit 32 on each column via the common control line 52. The control signal PVFTH supplied from the timing generator 90 is supplied to the switch SW2 of the column circuit 32 on each column via the common control line 54. The control signal PSH supplied from the waveform control circuit 56 is supplied to the switch SW3 of the column circuit 32 on each column via the common control line 62. The control signal PCR supplied from the waveform control circuit 68 is supplied to the switch SW4 of the column circuit 32 on each column via the common control line 70. That is, the column circuit 32 arranged on a column closer to the rightmost column in FIG. 1 is arranged at a place that is more distant from the timing generator 90 or the waveform control circuits 50, 56, and 68.

Figure 2:
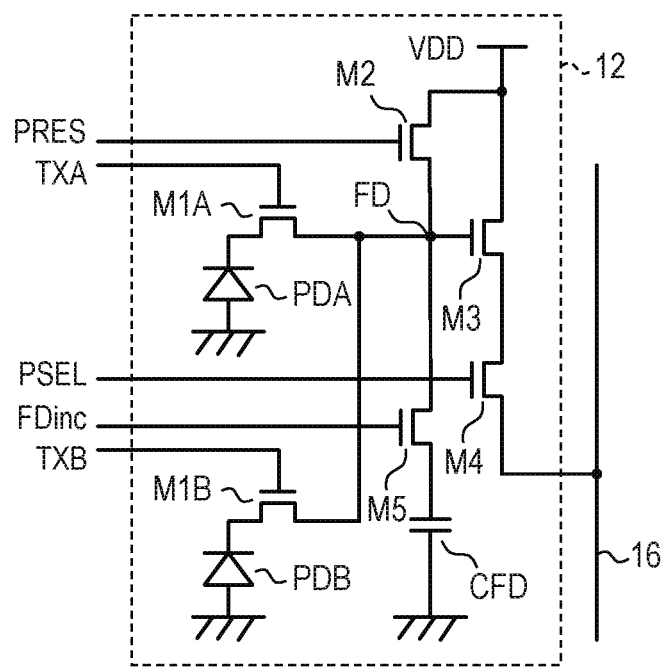
FIG. 2 is a circuit diagram illustrating a configuration example of a pixel in the photoelectric conversion device according to the first embodiment.

Next, a configuration example of the pixel 12 in the photoelectric conversion device according to the present embodiment will be described with reference to FIG. 2. FIG. 2 is a circuit diagram illustrating a configuration example of a pixel in the photoelectric conversion device according to the present embodiment.

Each of the pixels 12 in the photoelectric conversion device according to the present embodiment includes photoelectric converters PDA and PDB, transfer transistors M1A and M1B, a reset transistor M2, an amplifier transistor M3, and a select transistor M4, as described in FIG. 2, for example. In addition, the pixel 12 in the photoelectric conversion device according to the present embodiment further includes an FD control transistor M5 and a load capacitor CFD.

The photoelectric converters PDA and PDB are photodiodes, for example. The photodiode forming the photoelectric converter PDA has the anode connected to a reference voltage node and the cathode connected to the source of the transfer transistor M1A. The photodiode forming the photoelectric converter PDB has the anode connected to a reference voltage node and the cathode connected to the source of the transfer transistor M1B. The drain of the transfer transistor M1A and the drain of the transfer transistor M1B are connected to the source of the reset transistor M2, the gate of the amplifier transistor M3, and the drain of the FD control transistor M5. The connection node of the drains of the transfer transistors M1A and M1B, the source of the reset transistor M2, the gate of the amplifier transistor M3, and the drain of the PD control transistor M5 is a so-called a floating diffusion portion FD. The parasitic capacitance (FD capacitance) formed between the floating diffusion portion FD and another interconnection or diffusion region has a function of a charge holding portion. The load capacitor CFD is connected to the source of the FD control transistor M5. The drain of the reset transistor M2 and the drain of the amplifier transistor M3 are connected to a power supply node (voltage VDD). The source of the amplifier transistor M3 is connected to the drain of the select transistor M4. The source of the select transistor M4 is connected to the output line 16.

In the case of the pixel configuration of FIG. 2, the control line 14 arranged on each row includes a signal line used for supplying a control signal PRES, a signal line used for supplying a control signal TXA, a signal line used for supplying a control signal TXB, a signal line used for supplying a control signal PSEL, and a signal line used for supplying a control signal FDinc. The signal line used for supplying the control signal PRES is connected to the gate of the reset transistor M2 of each of the pixels 12 belonging to a corresponding row. The signal line used for supplying the control signal TXA is connected to the gate of the transfer transistor M1A of each of the pixels 12 belonging to a corresponding row. The signal line used for supplying the control signal TXB is connected to the gate of the transfer transistor M1B of each of the pixels 12 belonging to a corresponding row. The signal line used for supplying the control signal PSEL is connected to the gate of the select transistor M4 of each of the pixels 12 belonging to a corresponding row. The signal line used for supplying the control signal FDinc is connected to the gate of the FD control transistor M5 of each of the pixels 12 belonging to a corresponding row.

When each transistor forming the pixel 12 is formed of an n-channel transistor, a corresponding transistor is turned on when a high level control signal is supplied from the vertical scanning circuit 20. Further, a corresponding transistor is turned off when a low level control signal is supplied from the vertical scanning circuit 20. A common control signal is supplied from the vertical scanning circuit 20 to the pixels 12 on the same row.

The photoelectric converters PDA and PDB convert (photoelectrically convert) incident light into charges of an amount in accordance with the light amount and accumulate the generated charges. When turned on, the reset transistor M2 resets the floating diffusion portion FD to a voltage in accordance with the voltage VDD. When turned on, the transfer transistor M1A transfers charges accumulated in the photoelectric converter PDA to the floating diffusion portion FD. Further, when turned on, the transfer transistor M1B transfers charges accumulated in the photoelectric converter PDB to the floating diffusion portion FD. Thereby, the voltage of the floating diffusion portion FD becomes a voltage in accordance with an amount of charges transferred from the photoelectric converters PDA and PDB in accordance with charge-voltage conversion caused by the capacitance component of the floating diffusion portion FD.

The amplifier transistor M3 is configured such that the voltage VDD is supplied to the drain and a bias current is supplied from a current source (not illustrated) to the source via the select transistor M4 and the output line 16 and forms an amplifier unit (source follower circuit) whose gate is the input node. Thereby, the amplifier transistor M3 outputs a signal in accordance with the voltage of the floating diffusion portion FD to the output line 16 via the select transistor M4.

When turned on, the FD control transistor M5 connects the load capacitor CFD to the floating diffusion portion FD. That is, when the FD control transistor M5 is in the on-state, the FD capacitor and the load capacitor CFD are connected to each other in parallel, and the capacitance component coupled to the floating diffusion portion FD is larger than that when the FD control transistor M5 is in the off-state. That is, the pixel 12 is configured to be able to amplify a signal in accordance with the amount of charges transferred from the photoelectric converters PDA and PDB at a plurality of gains in accordance with the FD capacitance. In this sense, the FD control transistor M5 is a capacitance switching unit that switches the capacitance of the FD capacitor. Note that the capacitance of the capacitance component coupled to the floating diffusion portion FD may contribute to improvement of sensitivity when the capacitance is small and may contribute to expansion of the dynamic range when the capacitance is large.

Figure 3:
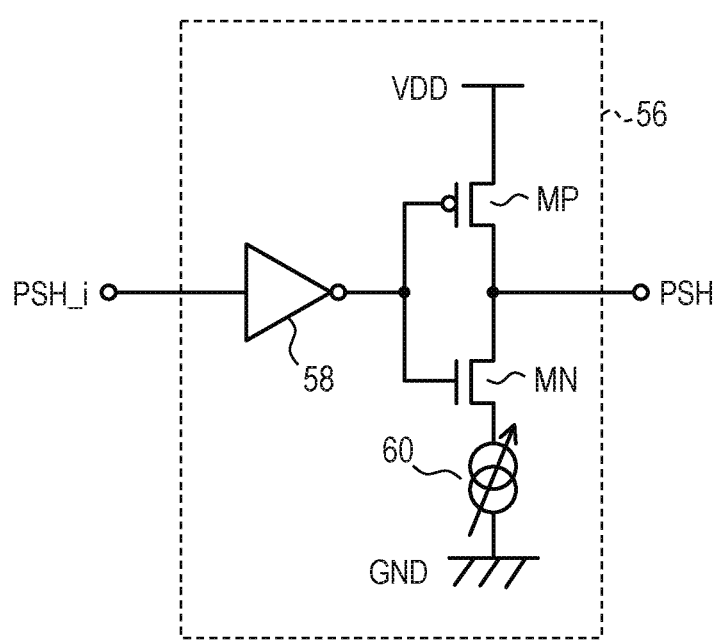
FIG. 3 is a circuit diagram illustrating a configuration example of a waveform control circuit in the photoelectric conversion device according to the first embodiment.

Next, a configuration example of the waveform control circuit 56 in the photoelectric conversion device according to the present embodiment will be described with reference to FIG. 3. FIG. 3 is a circuit diagram illustrating a configuration example of a waveform control circuit in the photoelectric conversion device according to the present embodiment.

The waveform control circuit 56 in the photoelectric conversion device according to the present embodiment includes an inverter circuit 58, an n-channel MOS transistor MN, a p-channel MOS transistor MP, and a current source 60 as illustrated in FIG. 3. The current source 60 is a variable current source that can change the amount of current to be supplied. The n-channel MOS transistor MN and the p-channel MOS transistor MP form an inverter circuit that is different from the inverter circuit 58. Note that, in the present specification, this post-stage inverter circuit and the current source 60 may be collectively referred to as a buffer circuit.

The input terminal of the inverter circuit 58 is also the input terminal of the waveform control circuit 56 and receives a control signal PSH_i from the timing generator 90. The output terminal of the inverter circuit 58 is connected to the gate of the n-channel MOS transistor MN and the gate of the p-channel MOS transistor MP. The node on the higher voltage power supply side of the post-stage inverter circuit, that is, the source of the p-channel MOS transistor MP is connected to a power supply on the higher voltage side (voltage VDD). The drain of the p-channel MOS transistor MP is connected to the drain of the n-channel MOS transistor MN. The node on the lower voltage power supply side of the post-stage inverter circuit, that is, the source of the n-channel MOS transistor MN is connected to the power supply on the lower voltage side (voltage VSS) via the current source 60. The connection node between the drain of the p-channel MOS transistor MP and the drain of the n-channel MOS transistor MN is the output terminal of the waveform control circuit 56. A signal output from the output terminal of the waveform control circuit 56 is the control signal PSH.

The n-channel MOS transistor MN and the p-channel MOS transistor MP form an inverter circuit that is different from the inverter circuit 58. That is, the waveform control circuit 56 is formed of a circuit in which two stages of inverter circuits are connected in series. The post-stage inverter circuit includes the current source 60 on the reference node (GND) side, and a falling time from a high level to a low level (settling time) can be controlled by a current value of the current source 60.

This settling time is typically a length of a period from start to end of transition from a high level voltage to a low level voltage. The end of transition to the low level voltage is not necessarily required to be the same voltage as the low level. For example, after transition from a high level to a low level is started, the transition rate per unit time (that is, the slope of the signal waveform) may decrease as time elapses. In such a case, the end of a settling time can be defined as the time when a voltage at which the transistor, which is a switch, can be regarded as in an off-state is reached. For example, a timing when 80% of a voltage difference from a high level to a low level has been changed from the high level can be regarded as the end of a settling time.

Further, transition from a high level to a low level may be performed by changing the slope of the control signal waveform during the transition. That is, a control signal may be changed with a smaller slope at start of transition and then changed with a larger slope. Further, a control signal may be changed with a larger slope at start of transition and then changed with a smaller slope.

Further, transition from a high level to a low level may be performed by changing the control signal stepwise. Further, the control signal may be caused to once transition to a potential between the high level and the low level and then transition to the low level. These cases are also included in a form to increase the settling time from the high level to the low level.

Further, the falling time of the control signal from the high level to the low level is longer than the rising time from the low level to the high level.

Note that, although description is omitted here, the waveform control circuits 50 and 68 can be formed of the same circuit as the waveform control circuit 56. That is, the waveform control circuit 50 may be configured to receive the control signal PC0R_i from the timing generator 90 and output the control signal PC0R whose falling time is controlled (see the third embodiment). Further, the waveform control circuit 68 may be configured to receive the control signal PCR_i from the timing generator 90 and output the control signal PCR whose falling time is controlled (see the fourth embodiment).

A process of holding a pixel signal, which is output from the pixel region 10 to the output line 16 on each column, in the signal holding capacitor Cs on each column via the amplifiers 34 and 36 will now be considered.

When a pixel signal is held in the signal holding capacitor Cs on each column, the control signal PHS output from the waveform control circuit 56 is controlled from the low level to the high level to turn on the switch SW3 of the column circuit 32 on each column. Thereby, the output terminal of the amplifier 36 and the signal holding capacitor Cs are connected to each other, and sampling of the pixel signal amplified by the amplifiers 34 and 36 to the signal holding capacitor Cs is started.

The control signal PSH is supplied to the column circuit 32 on each column via the common control line 62 arranged in the row direction. Since the waveform control circuit 56 is arranged on one side of the readout circuit unit 30 (the left side in FIG. 1) as described above, the delay time of the control signal PSH is different between a column close to the waveform control circuit 56 and a column distant from the waveform control circuit 56. Such a difference in the delay time of the control signal PSH causes a difference in the charge injection amount caused by charge injection due to driving of the switch SW3 when the switch SW3 transitions from the conductive state to the nonconductive state in response to the control signal PSH. Since such a difference in the charge injection amount affects the amount of signal charge held in the signal holding capacitor Cs on each column, a difference in the delay time of the control signal PSH causes image quality deterioration. The same phenomenon may occur with the control signals PC0R and PCR.

Next, a case where intense light enters some of the pixels 12 of the pixel region 10 will be further considered. When intense light enters some of the pixels 12 of the pixel region 10, the potential of the output line 16 on a corresponding column is significantly reduced on a row including the pixels 12 that the intense light enters due to a pixel signal output from the pixel 12 that the intense light enters. The voltage of the output node of the amplifier 36 then increases in accordance with the level of the pixel signal or the amplification factor of the amplifier 34 and 36 of the pixel 12 subjected to the intense light, and the switch SW3 of the column circuit 32 is turned off on a column to which the pixels 12 that the intense light enters belong. On the other hand, on a row not including the pixel 12 that the intense light enters, the voltage of the output node of the amplifier 36 decreases, and the switches SW3 of the column circuit 32 on all the columns are turned on. As a result, the load capacitance extending over the control lines 62 is larger on the rows not including the pixels 12 that the intense light enters than on the rows including the pixels 12 that the intense light enters.

In such a way, when intense light enters some of the pixels 12 of the pixel region 10, a difference may occur in a load capacitance extending over the control line 62 between rows including the pixels 12 that the intense light enters and rows not including the pixels 12 that the intense light enters. Due to such a difference in the load capacitance, the length of a period in which the control signal PSH transitions from a high level (where the switch SW3 is in a conductive state) to a low level (where the switch SW3 is in a nonconductive state) will differ for respective rows, and this may cause deterioration of image quality due to pattern noise such as horizontal smear.

As described above, the arrangement location of the column circuits 32 or the distribution of incident light intensities to the pixels 12 may affect the period in which the control signal PSH transitions from the high level to the low level and may cause image quality deterioration.

A countermeasure against deterioration of image quality due to variation of the period in which the control signal PSH transitions from the high level to the low level may be a method to increase the length of a period in which the control signal PSH transitions from the high level to the low level. With such a configuration, since the difference in the delay time of the control signal PSH between a column close to the waveform control circuit 56 and a column distant from the waveform control circuit 56 is reduced, the influence on the image quality deterioration is reduced.

However, at a high gain where the amplification factor of an amplifier is large, it takes a longer time before a signal is settled than at a low gain. Therefore, the conductive state of the switch SW3 at the high gain is required to be longer than at the low gain in order to avoid a situation where sampling of a pixel signal to the signal holding capacitor Cs ends before the signal is settled. However, if the period in which the control signal PSH transitions from the high level to the low level is increased in the same manner as at the low gain, the reading time will be increased. Further, when an increase of the readout time at a high gain is significant, the length of a vertical scanning period at a high gain is required to be longer than the length of a vertical scanning period at a low gain, and this results in a complex readout operation.

In terms of the above, in the present embodiment, while the length of the period in which the control signal PSH transitions from the high level to the low level at a low gain is increased, the length of the period in which the control signal PSH transitions from the high level to the low level at a high gain is controlled to be shorter than that at the low gain.

The deterioration of image quality due to variation of the period in which the control signal PSH transitions from the high level to the low level is significant at the low gain where the amplification factor of an amplifier is small. Therefore, by increasing the length of the period in which the control signal PSH transitions from the high level to the low level at the low gain, it is possible to suppress the deterioration of image quality due to variation of the period in which the control signal PSH transitions from the high level to the low level.

Further, the pixel signal held in the signal holding capacitor Cs is an amplified pixel signal. Thus, influence on image quality deterioration due to a difference in the load capacitance extending over the control lines 62 between a row including the pixels 12 that intense light enters and a row not including the pixels 12 that the intense light enters is smaller at the high gain than at the low gain. Therefore, by controlling the period in which the control signal PSH transitions from the high level to the low level to be shorter at the high gain than at the low gain, it is possible to suppress an increase of a readout period.

Figure 4:
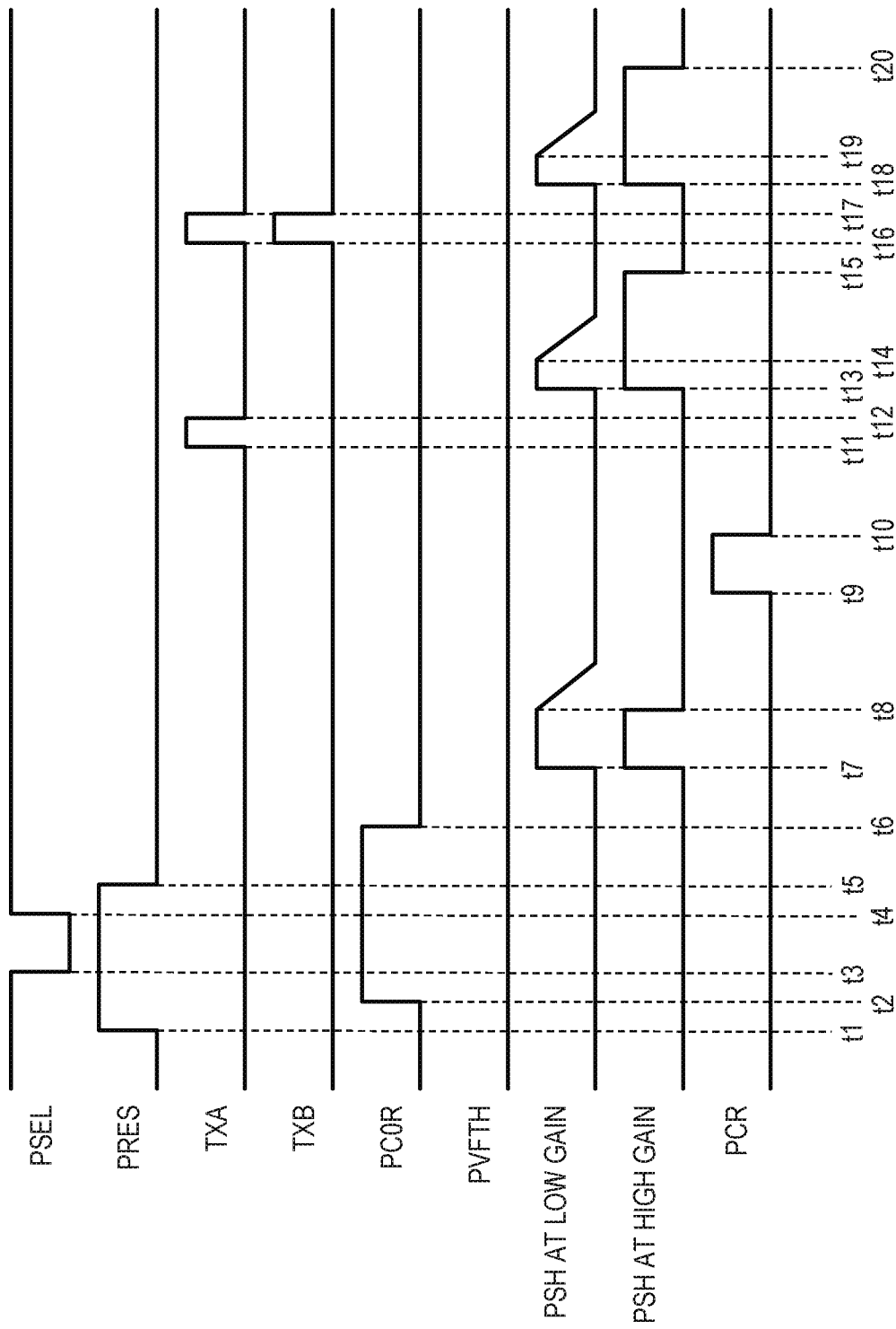
FIG. 4 is a timing diagram illustrating a method of driving the photoelectric conversion device according to the first embodiment.

Next, a method of driving the photoelectric conversion device according to the present embodiment will be described with reference to FIG. 4. FIG. 4 is a timing diagram illustrating the method of driving the photoelectric conversion device according to the present embodiment. FIG. 4 illustrates the waveforms of the control signals PSEL, PRES, TXA, and TXB supplied to the control line 14 on a row to which the pixels 12 to be read out belong and the waveforms of the control signals PC0R, PVFTH, PSH, and PCR supplied to the readout circuit unit 30. For the control signal PSH, a case at a low gain and a case at a high gain are illustrated.

In the period before time t1, the control signal PSEL is at the high level, and the control signals PRES, TXA, TXB, PC0R, PVFTH, PSH, and PCR are at the low level. The period to time t3 in which the control signal PSEL is at the high level corresponds to a state where a row previous to a row to which the pixels 12 to be read out from time t4 belong is selected.

At time t1, the vertical scanning circuit 20 controls the control signal PRES from the low level to the high level under the control of the timing generator 90. Thereby, the reset transistor M2 of the pixel 12 is turned on, and the floating diffusion portion FD is reset to a voltage in accordance with the voltage VDD.

At this time, the control signals TXA and TXB are at the low level, and the transfer transistors M1A and M1B of the pixel 12 are in the off-state. The photoelectric converters PDA and PDB are disconnected from the amplifier unit (the gate of the amplifier transistor M3) and are in a floating state. The photoelectric converters PDA and PDB photoelectrically convert incident light and accumulate the generated charge. Further, the control signals PC0R, PVFTH, PSH, and PCR are at the low level, and all the switches SW1, SW2, SW3, and SW4 of the column circuit 32 are in the off-state.

At subsequent time t2, the waveform control circuit 50 controls the control signal PC0R from the low level to the high level under the control of the timing generator 90. Thereby, the switch SW1 of the column circuit 32 on each column is turned on, the input terminal and the output terminal of the amplifier 34 are short-circuited, and the signal in a reset state of the pixel 12 is clamped at the reference voltage Vref.

At subsequent time t3, the vertical scanning circuit 20 controls the control signal PSEL on the previous row from the high level to the low level under the control of the timing generator 90. Thereby, selection of the previous row is released.

At subsequent time t4, the vertical scanning circuit 20 controls the control signal PSEL from the low level to the high level under the control of the timing generator 90. Thereby, the select transistor M4 is turned on, and the amplifier transistor M3 of the pixel 12 is connected to the output line 16 via the select transistor M4.

At subsequent time t5, the vertical scanning circuit 20 controls the control signal PRES from the high level to the low level under the control of the timing generator 90. Thereby, the reset transistor M2 is turned off, and the voltage of the floating diffusion portion FD becomes a predetermined reset voltage in accordance with the voltage VDD. The amplifier transistor M3 outputs a pixel signal (noise signal) in accordance with a reset voltage of the floating diffusion portion FD to the output line 16 via the select transistor M4.

At subsequent time t6, the waveform control circuit 50 controls the control signal PC0R from the high level to the low level under the control of the timing generator 90. Thereby, the switch SW1 is turned off, and the reset state of the amplifier 34 is released. The amplifier 34 is in a state of amplifying a pixel signal at an amplification factor in accordance with a ratio (C0/Cf) of the input capacitance C0 and the feedback capacitance Cf and outputting the amplified pixel signal.

At subsequent time t7, the waveform control circuit 56 controls the control signal PSH from the low level to the high level under the control of the timing generator 90. Thereby, the switch SW3 is turned on, and the pixel signal amplified by the amplifiers 34 and 36 (noise signal) is sampled in the signal holding capacitor Cs.

At subsequent time t8, the waveform control circuit 56 controls the control signal PSH from the high level to the low level under the control of the timing generator 90. Thereby, the switch SW3 is turned off, and holding of the pixel signal to the signal holding capacitor Cs is completed. Because the switch SW3 is turned off, the signal holding capacitor Cs is disconnected from the amplifiers 34 and 36.

At this time, the length of the period in which the control signal PSH transitions from the high level to the low level (falling time) is determined by a current amount flowing in the current source 60. That is, the smaller the current amount flowing in the current source 60 is, the longer the falling time of the control signal PSH will be. When the waveform control circuit 56 is formed of the circuit illustrated in FIG. 3, for example, the falling time of the control signal PSH is longer than the rising time of the control signal PSH.

At the low gain where the amplification factor of the pixel signal provided by the amplifiers 34 and 36 is small, the current source 60 is driven at constant current so that the length of a period in which the switch SW3 is switched from the conductive state to the nonconductive state is longer than the length of a period in which the switch SW3 is switched from the nonconductive state to the conductive state. Thereby, a difference in the delay time of the control signal PSH between the column circuit 32 on a column close to the waveform control circuit 56 and the column circuit 32 on a column distant from the waveform control circuit 56 can be reduced.

At the high gain where the amplification factor of the pixel signal provided by the amplifiers 34 and 36 is large, the current amount flowing in the current source 60 is controlled to be larger than the current amount flowing in the current source 60 at the low gain so that the length of the period in which the switch SW3 is switched from the conductive state to the nonconductive state is shorter than that at the low gain. Thereby, the length of the period in which the switch SW3 is switched from the conductive state to the nonconductive state can be reduced to be shorter than that at the low gain.

At subsequent time t9, the waveform control circuit 68 controls the control signal PCR from the low level to the high level under the control of the timing generator 90. Accordingly, the switch SW4 is turned on, the input terminal and the output terminal of the comparator 38 are short-circuited, and thereby the comparator 38 is reset (or initialized).

At subsequent time t10, the waveform control circuit 68 controls the control signal PCR from the high level to the low level under the control of the timing generator 90. Accordingly, the switch SW4 is turned off, the input terminal and the output terminal of the comparator 38 are disconnected from each other, and the reset state of the comparator 38 is released.

The period from time t10 to time t13 is a period in which analog-to-digital conversion of the pixel signal (noise signal) held in the signal holding capacitor Cs is performed. During this period, the comparator 38 compares the signal level of the signal holding capacitor Cs with the signal level of a reference signal (ramp signal) supplied from the reference signal generation circuit 64 via the reference signal line 66 and outputs a latch signal to the memory 40 at a timing when the relationship of these levels is inverted. The memory 40 stores, as digital data of a pixel signal (noise signal), a count value indicated by a count signal at a timing when the latch signal is received form the comparator 38.

At subsequent time t11, the vertical scanning circuit 20 controls the control signal TXA from the low level to the high level under the control of the timing generator 90. Thereby, the transfer transistor M1A is turned on, charge accumulated in the photoelectric converter PDA is transferred to the floating diffusion portion PD, and the voltage of the floating diffusion portion FD becomes a voltage (Vsiga) in accordance with the amount of charge transferred from the photoelectric converter PDA. The amplifier transistor M3 outputs a pixel signal—optical signal (A-signal)—in accordance with the voltage Vsiga of the floating diffusion portion FD to the output line 16 via the select transistor M4.

At subsequent time t12, the vertical scanning circuit 20 controls the control signal TXA from the high level to the low level under the control of the timing generator 90. Thereby, the transfer transistor M1A is turned off, and the photoelectric converter PDA is in a charge accumulation state.

At subsequent time t13, the waveform control circuit 56 controls the control signal PSH from the low level to the high level under the control of the timing generator 90. Thereby, the switch SW3 is turned on, the pixel signal—optical signal (A-signal)—amplified by the amplifiers 34 and 36 is sampled in the signal holding capacitor Cs.

At the low gain where the amplification factor of the pixel signal provided by the amplifiers 34 and 36 is small, the waveform control circuit 56 controls the control signal PSH from the high level to the low level under the control of the timing generator 90 at subsequent time t14. Thereby, the switch SW3 is turned off, and the holding of the pixel signal to the signal holding capacitor Cs is completed. Because the switch SW3 is turned off, the signal holding capacitor Cs is disconnected from the amplifiers 34 and 36. At this time, the current source 60 is driven at constant current so that the length of a period in which the switch SW3 is switched from the conductive state to the nonconductive state is longer than the length of a period in which the switch SW3 is switched from the nonconductive state to the conductive state. Thereby, a difference in the delay time of the control signal PSH between the column circuit 32 on a column close to the waveform control circuit 56 and the column circuit 32 on a column distant from the waveform control circuit 56 can be reduced.

At the high gain where the amplification factor of the pixel signal provided by the amplifiers 34 and 36 is large, since it takes a longer time before a signal is settled than at the low gain, the sampling operation is continued to time t15 that is later than time t14.

At the high gain where the amplification factor of the pixel signal provided by the amplifiers 34 and 36 is large, the waveform control circuit 56 controls the control signal PSH from the high level to the low level under the control of the timing generator 90 at subsequent time t15. Thereby, the switch SW3 is turned off, and the holding of the pixel signal to the signal holding capacitor Cs is completed. Because the switch SW3 is turned off, the signal holding capacitor Cs is disconnected from the amplifiers 34 and 36. At this time, the current amount flowing in the current source 60 is controlled to be larger than the current amount flowing in the current source 60 at the low gain so that the length of the period in which the switch SW3 is switched from the conductive state to the nonconductive state is shorter than that at the low gain. Thereby, the length of the period in which the switch SW3 is switched from the conductive state to the nonconductive state can be reduced to be shorter than that at the low gain, and an increase of the readout time is suppressed.

The period from time t15 to time t18 is a period in which analog-to-digital conversion of the pixel signal—optical signal (A-signal)—held in the signal holding capacitor Cs is performed. During this period, the comparator 38 compares the signal level of the signal holding capacitor Cs with the signal level of a reference signal (ramp signal) supplied from the reference signal generation circuit 64 via the reference signal line 66 and outputs a latch signal to the memory 40 at a timing when the relationship of these levels is inverted. The memory 40 stores, as digital data of the pixel signal—optical signal (A-signal)—, a count value indicated by a count signal at a timing when the latch signal is received form the comparator 38.

At subsequent time t16, the vertical scanning circuit 20 controls the control signals TXA and TXB from the low level to the high level under the control of the timing generator 90. Thereby, the transfer transistors M1A and M1B are turned on, charges accumulated in the photoelectric converters PDA and PDB are transferred to the floating diffusion portion FD, and the voltage of the floating diffusion portion FD becomes a voltage (Vsigb) in accordance with the amount of charges transferred from the photoelectric converters PDA and PDB. The amplifier transistor M3 outputs a pixel signal—optical signal [(A+B)-signal]— in accordance with the voltage Vsigb of the floating diffusion portion FD to the output line 16 via the select transistor M4.

At subsequent time t17, the vertical scanning circuit 20 controls the control signals TXA and TXB from the high level to the low level under the control of the timing generator 90. Thereby, the transfer transistors M1A and M1B are turned off, and the photoelectric converters PDA and PDB are in a charge accumulation state.

At subsequent time t18, the waveform control circuit 56 controls the control signal PSH from the low level to the high level under the control of the timing generator 90. Thereby, the switch SW3 is turned on, the pixel signal—optical signal [(A+B)-signal]— amplified by the amplifiers 34 and 36 is sampled in the signal holding capacitor Cs.

At the low gain where the amplification factor of the pixel signal provided by the amplifiers 34 and 36 is small, the waveform control circuit 56 controls the control signal PSH from the high level to the low level under the control of the timing generator 90 at subsequent time t19. Thereby, the switch SW3 is turned off, and the holding of the pixel signal to the signal holding capacitor Cs is completed. Because the switch SW3 is turned off, the signal holding capacitor Cs is disconnected from the amplifiers 34 and 36. At this time, the current source 60 is driven at constant current so that the length of a period in which the switch SW3 is switched from the conductive state to the nonconductive state is longer than the length of a period in which the switch SW3 is switched from the nonconductive state to the conductive state. Thereby, a difference in the delay time of the control signal PSH between the column circuit 32 on a column close to the waveform control circuit 56 and the column circuit 32 on a column distant from the waveform control circuit 56 can be reduced.

At the high gain where the amplification factor of the pixel signal provided by the amplifiers 34 and 36 is large, since it takes a longer time before a signal is settled than at the low gain, the sampling operation is continued to time t20 that is later than time t19.

At the high gain where the amplification factor of the pixel signal provided by the amplifiers 34 and 36 is large, the waveform control circuit 56 controls the control signal PSH from the high level to the low level under the control of the timing generator 90 at subsequent time t20. Thereby, the switch SW3 is turned off, and the holding of the pixel signal to the signal holding capacitor Cs is completed. Because the switch SW3 is turned off, the signal holding capacitor Cs is disconnected from the amplifiers 34 and 36. At this time, the current amount flowing in the current source 60 is controlled to be larger than the current amount flowing in the current source 60 at the low gain so that the length of the period in which the switch SW3 is switched from the conductive state to the nonconductive state is shorter than that at the low gain. Thereby, the length of the period in which the switch SW3 is switched from the conductive state to the nonconductive state can be reduced to be shorter than that at the low gain, and an increase of the readout time can be suppressed.

The period from time t20 is a period in which analog-to-digital conversion of the pixel signal—optical signal [(A+B)-signal]— held in the signal holding capacitor Cs is performed. During this period, the comparator 38 compares the signal level of the signal holding capacitor Cs with the signal level of a reference signal (ramp signal) supplied from the reference signal generation circuit 64 via the reference signal line 66 and outputs a latch signal to the memory 40 at a timing when the relationship of these levels is inverted. The memory 40 stores, as digital data of the pixel signal—optical signal [(A+B)-signal]—, a count value indicated by a count signal at a timing when the latch signal is received form the comparator 38.

The horizontal scanning circuit 80 then scans the column circuits 32 on respective columns under the control of the timing generator 90 and externally outputs digital data of a pixel signal held in the memories 40 of the column circuits 32 on respective columns via the horizontal output line 76.

As described above, according to the present embodiment, it is possible to suppress variation of an offset component superimposed on a pixel signal and improve image quality without increasing readout time even when the pixel signal is amplified. Further, by suppressing an increase in readout time at the high gain, it becomes easy to have the same length of vertical scanning periods for both at the low gain and at the high gain.

Second Embodiment

Figure 5:
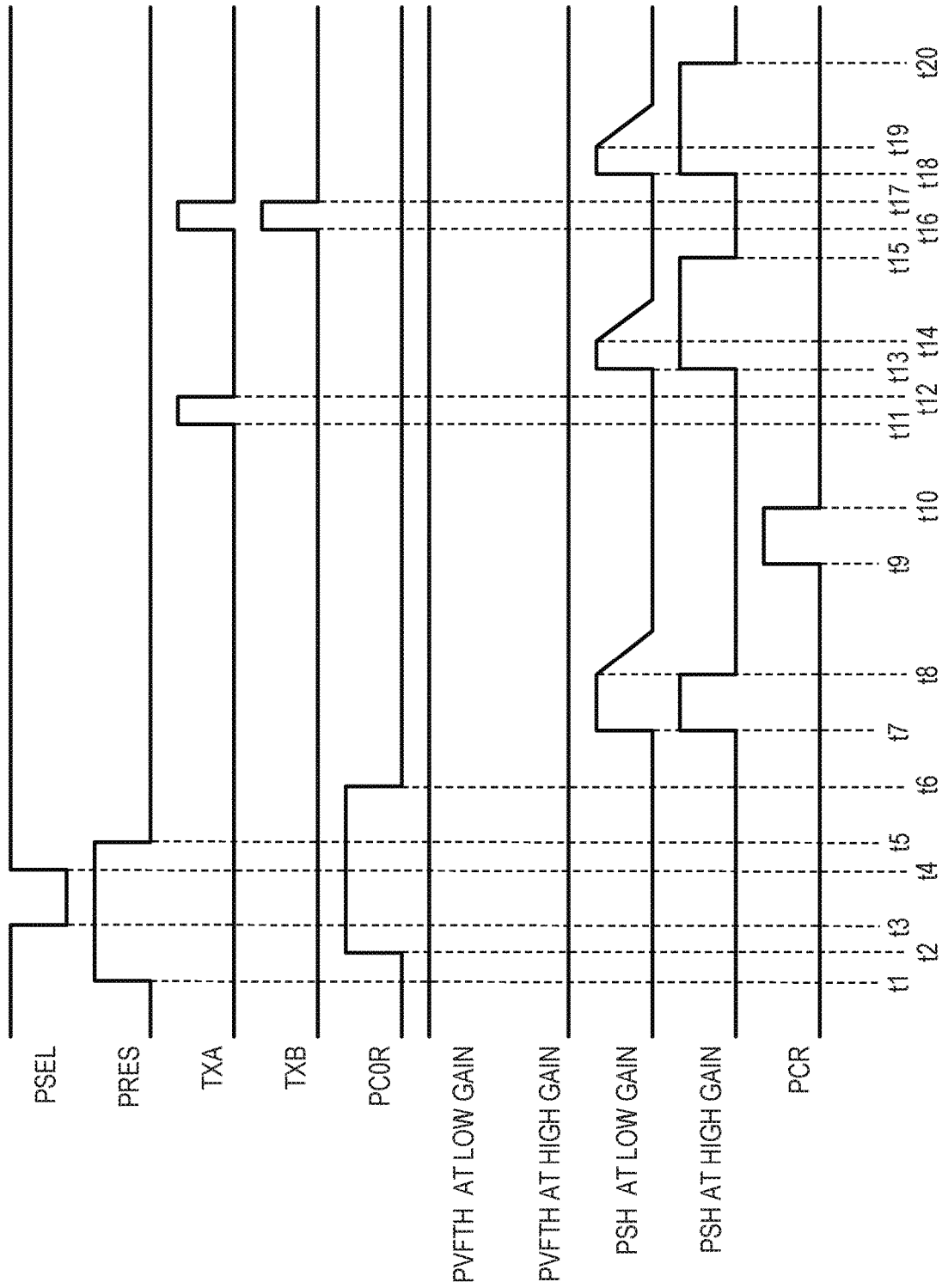
FIG. 5 is a timing diagram illustrating a method of driving a photoelectric conversion device according to a second embodiment.

A method of driving a photoelectric conversion device according to a second embodiment will be described with reference to FIG. 5. The same components as those of the photoelectric conversion device according to the first embodiment are labeled with the same references, and the description thereof will be omitted or simplified. FIG. 5 is a timing diagram illustrating the method of driving the photoelectric conversion device according to the present embodiment. In the present embodiment, another method of driving the photoelectric conversion device described in the first embodiment will be described.

The method of driving the photoelectric conversion device according to the present embodiment is the same as the method of driving the photoelectric conversion device according to the first embodiment except for a difference in the control signal PVFTH. That is, in the method of driving the photoelectric conversion device according to the present embodiment, the control signal PVFTH is maintained at the high level at the low gain, and the control signal PVFTH is maintained at the low level at the high gain, as illustrated in FIG. 5.

The control signal PVFTH is a control signal to drive the switch SW2 that selects whether or not to use the amplifier 36. When the control signal PVFTH is at the low level, the switch SW2 is in a nonconductive state, and a pixel signal output from the amplifier 34 is output to the signal holding capacitor Cs via the amplifier 36. On the other hand, when the control signal PVFTH is at the low level, the switch SW2 is in a conductive state, and a pixel signal output from the amplifier 34 is output to the signal holding capacitor Cs without via the amplifier 36.

At the low gain where the amplification factor of the amplifier 34 is small, the control signal PVFTH is controlled to the high level to form a signal path not using the amplifier 36. With such a configuration, power consumption at a low gain can be reduced.

On the other hand, at the high gain where the amplification factor of the amplifier 34 is large, drive current of the amplifier 34 is controlled to be larger than drive current at the low gain. Further, the control signal PVFTH is controlled to the low level to form a signal path using the amplifier 36.

At the high gain, since it takes a longer time until a signal is settled than at the low gain, readout time of a signal may increase. By increasing drive current of the amplifier 34 and employing a configuration to use the amplifier 36, it is possible to reduce the settling time of a signal at the high gain. Accordingly, it is possible to suppress an increase in readout time of a signal.

Note that, although the column amplifier unit is formed of two stages of the amplifier 34 and the amplifier 36 in the present embodiment, the number of stages of amplifiers forming the column amplifier unit may be further increased. In such a case, it is possible to define states of a low gain and a high gain in accordance with the number of stages of amplifiers forming the column amplifier unit.

As described above, according to the present embodiment, it is possible to suppress variation of an offset component superimposed on a pixel signal and improve image quality without increasing readout time even when the pixel signal is amplified.

Third Embodiment

Figure 6:
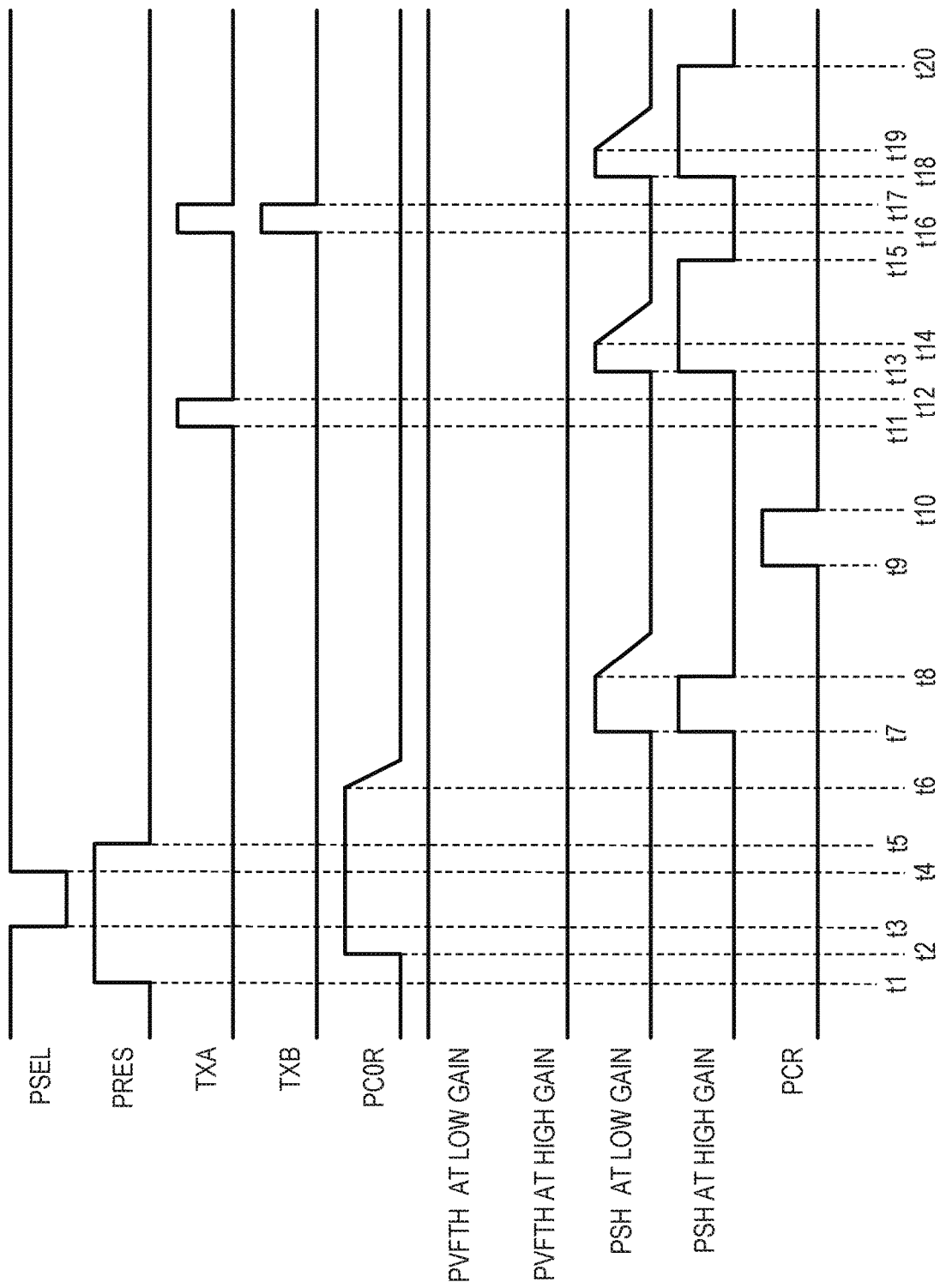
FIG. 6 is a timing diagram illustrating a method of driving a photoelectric conversion device according to a third embodiment.

A method of driving a photoelectric conversion device according to a third embodiment will be described with reference to FIG. 6. The same components as those of the photoelectric conversion device according to the first and second embodiments are labeled with the same references, and the description thereof will be omitted or simplified. FIG. 6 is a timing diagram illustrating the method of driving the photoelectric conversion device according to the present embodiment. In the present embodiment, another method of driving the photoelectric conversion device described in the first embodiment will be described.

The method of driving the photoelectric conversion device according to the present embodiment is the same as the method of driving the photoelectric conversion device according to the second embodiment except for a difference in the waveform of the control signal PC0R. That is, in the method of driving the photoelectric conversion device according to the present embodiment, the length of a period in which the control signal PC0R transitions from the high level to the low level is longer than the length of a period in which the control signal PC0R transitions from the low level to the high level, as illustrated in FIG. 6. The control signal PC0R is a control signal to drive the switch SW1 that controls a reset operation of the amplifier 34.

The control signal PC0R output from the waveform control circuit 50 is supplied to the column circuit 32 on each column via the common control line 52 arranged in the row direction. Since the waveform control circuit 50 is arranged on one side (the left side in FIG. 1) of the readout circuit unit 30 as described above, the delay time of the control signal PC0R is different between a column close to the waveform control circuit 50 and a column distant from the waveform control circuit 50. Such a difference in the delay time of the control signal PC0R causes a difference in the charge injection amount caused by charge injection due to driving of the switch SW2 when the switch SW2 transitions from the conductive state to the nonconductive state in response to the control signal PC0R. Since such a difference in the charge injection amount corresponds to a difference in the offset level of the amplifier 34 on each column, the difference in the delay time of the control signal PC0R causes image quality deterioration.

In terms of the above, in the present embodiment, the length of a period in which the control signal PC0R transitions from the high level to the low level is longer than the length of a period in which the control signal PC0R transitions from the low level to the high level. With such a configuration, a difference in the delay time of the control signal PC0R is reduced between a column close to the waveform control circuit 50 and a column distant from the waveform control circuit 50, and therefore a difference in offset levels of the amplifiers 34 on respective columns can be reduced.

The length of the period in which the control signal PC0R transitions from the high level to the low level can be controlled in the same manner as in the case of the control signal PSH. That is, by forming the waveform control circuit 50 by using the same circuit as the circuit illustrated in FIG. 3 and causing the current amount flowing in the current source 60 to be smaller than in the case of the first or second embodiment, it is possible to increase the length of the period in which the control signal PC0R transitions from the high level to the low level.

As described above, according to the present embodiment, it is possible to suppress variation of an offset component superimposed on a pixel signal and improve image quality without increasing readout time even when the pixel signal is amplified.

Fourth Embodiment

Figure 7:
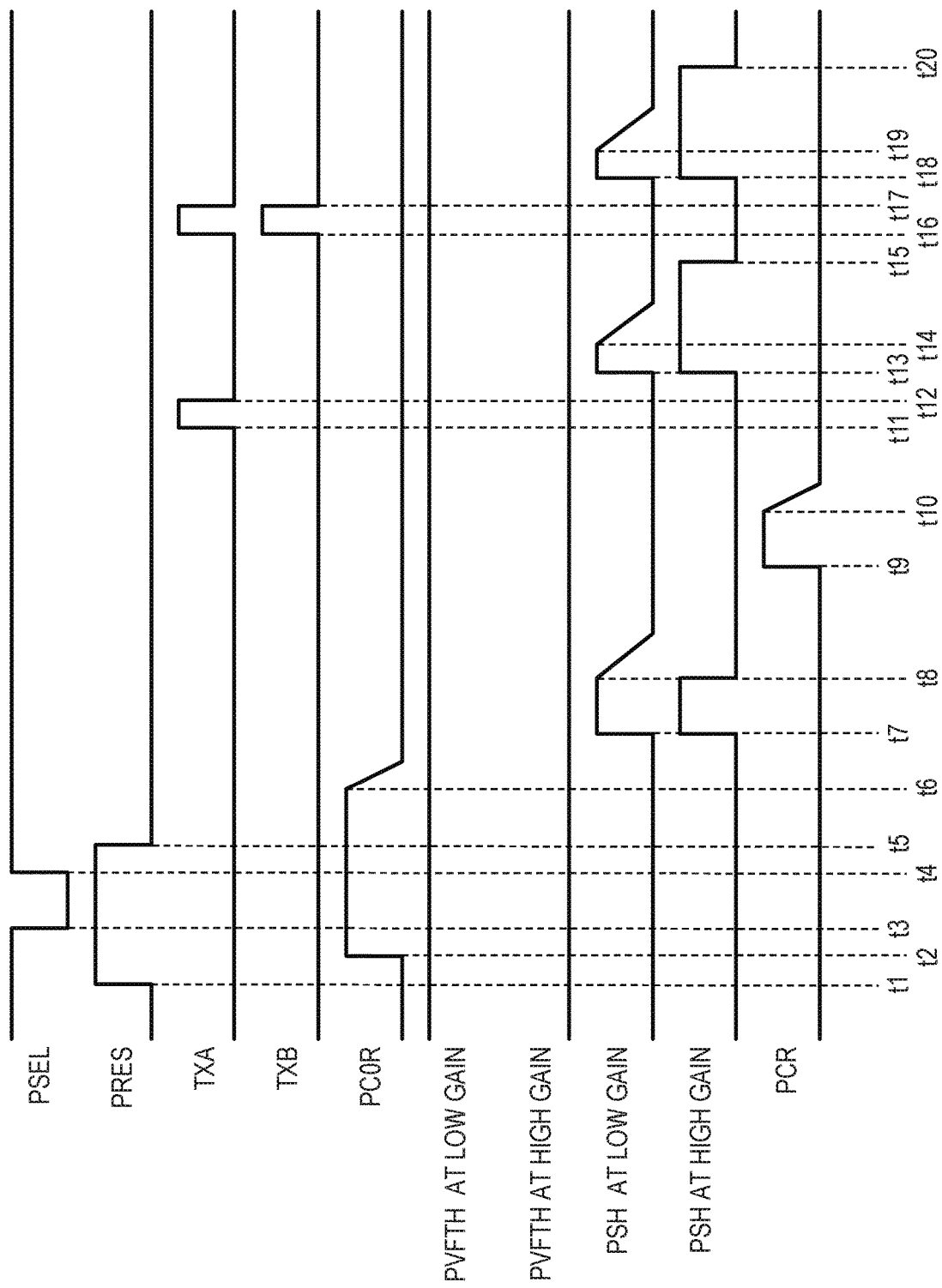
FIG. 7 is a timing diagram illustrating a method of driving a photoelectric conversion device according to a fourth embodiment.

A method of driving a photoelectric conversion device according to a fourth embodiment will be described with reference to FIG. 7. The same components as those of the photoelectric conversion device according to the first to third embodiments are labeled with the same references, and the description thereof will be omitted or simplified. FIG. 7 is a timing diagram illustrating the method of driving the photoelectric conversion device according to the present embodiment. In the present embodiment, another method of driving the photoelectric conversion device described in the first embodiment will be described.

The method of driving the photoelectric conversion device according to the present embodiment is the same as the method of driving the photoelectric conversion device according to the third embodiment except for a difference in the waveform of the control signal PCR. That is, in the method of driving the photoelectric conversion device according to the present embodiment, the length of a period in which the control signal PCR transitions from the high level to the low level is longer than the length of a period in which the control signal PCR transitions from the low level to the high level, as illustrated in FIG. 7. The control signal PCR is a control signal to drive the switch SW4 that controls a reset operation of the comparator 38.

The control signal PCR output from the waveform control circuit 68 is supplied to the column circuit 32 on each column via the common control line 70 arranged in the row direction. Since the waveform control circuit 68 is arranged on one side (the left side in FIG. 1) of the readout circuit unit 30 as described above, the delay time of the control signal PCR is different between a column close to the waveform control circuit 68 and a column distant from the waveform control circuit 68. Such a difference in the delay time of the control signal PCR causes a difference in the charge injection amount caused by charge injection due to driving of the switch SW4 when the switch SW4 transitions from the conductive state to the nonconductive state in response to the control signal PCR. Since such a difference in the charge injection amount corresponds to a difference in offset levels of the comparators 38 on respective columns, the difference in the delay time of the control signal PCR causes image quality deterioration.

In terms of the above, in the present embodiment, the length of a period in which the control signal PCR transitions from the high level to the low level is longer than the length of a period in which the control signal PCR transitions from the low level to the high level. With such a configuration, a difference in the delay time of the control signal PCR is reduced between a column close to the waveform control circuit 68 and a column distant from the waveform control circuit 68, and therefore a difference in offset levels of the comparators 38 on respective columns can be reduced.

The length of the period in which the control signal PCR transitions from the high level to the low level can be controlled in the same manner as in the case of the control signal PSH. That is, by forming the waveform control circuit 68 by using the same circuit as the circuit illustrated in FIG. 3 and causing the current amount flowing in the current source 60 to be smaller than in the case of the first to third embodiments, it is possible to increase the length of the period in which the control signal PCR transitions from the high level to the low level.

As described above, according to the present embodiment, it is possible to suppress variation of an offset component superimposed on a pixel signal and improve image quality without increasing readout time even when the pixel signal is amplified.

Fifth Embodiment

Figure 8:
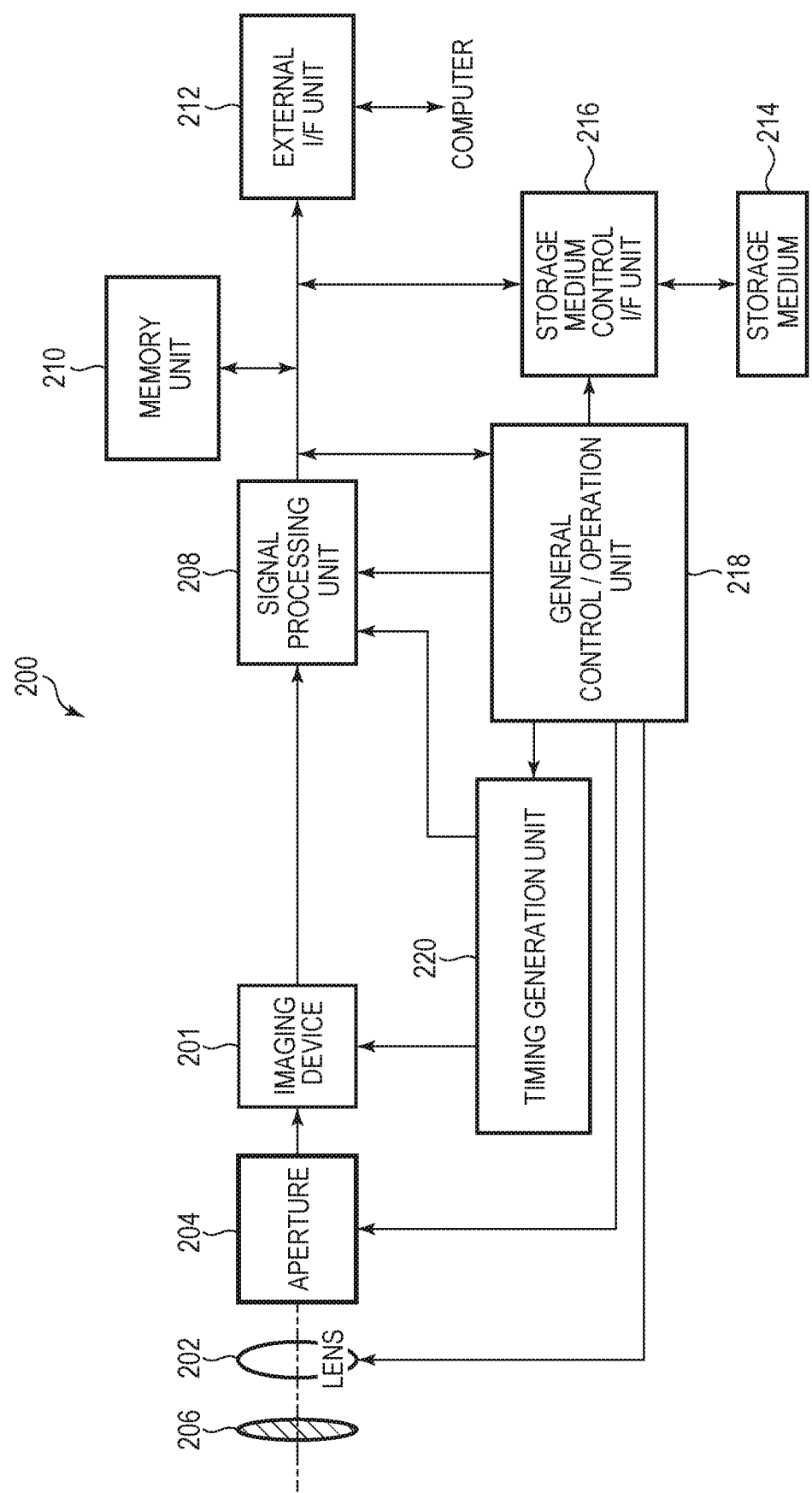
FIG. 8 is a block diagram illustrating a general configuration of an imaging system according to a fifth embodiment.

An imaging system according to a fifth embodiment will be described with reference to FIG. 8. FIG. 8 is a block diagram illustrating a general configuration of the imaging system according to the present embodiment.

The photoelectric conversion device 100 described in the above first to fourth embodiments can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 8 illustrates a block diagram of a digital still camera as an example out of these examples.

An imaging system 200 illustrated as an example in FIG. 8 includes an imaging device 201, a lens 202 that captures an optical image of a subject onto the imaging device 201, an aperture 204 for changing a light amount passing through the lens 202, and a barrier 206 for protecting the lens 202. The lens 202 and the aperture 204 form an optical system that collects a light onto the imaging device 201. The imaging device 201 is the photoelectric conversion device 100 described in any of the first to fourth embodiments and converts an optical image captured by the lens 202 into image data.

Further, the imaging system 200 includes a signal processing unit 208 that processes a signal output from the imaging device 201. The signal processing unit 208 generates image data from digital signals output by the imaging device 201. Further, the signal processing unit 208 performs operations of performing various correction or compression to output image data, if necessary. The photoelectric conversion device 100 may include an AD conversion unit that generates a digital signal processed in the signal processing unit 208. The AD conversion unit may be formed in a semiconductor layer (a semiconductor substrate) in which the photoelectric converter of the imaging device 201 is formed or may be formed on a different semiconductor substrate from the semiconductor layer in which the photoelectric converter of the imaging device 201 is formed. Further, the signal processing unit 208 may be formed on the same semiconductor substrate as the imaging device 201.

Furthermore, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Furthermore, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

As described above, according to the present embodiment, the imaging system to which the photoelectric conversion device 100 according to any of the first to fourth embodiments is applied can be realized.

Sixth Embodiment

Figure 9A:
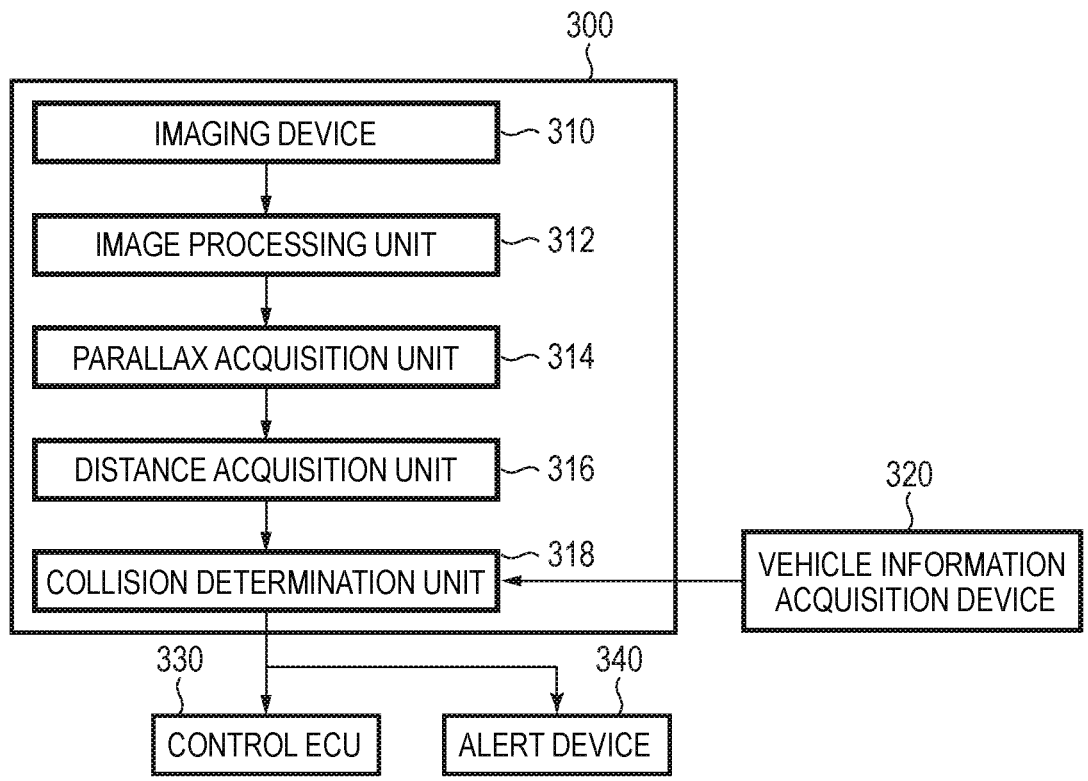
FIG. 9A is a diagram illustrating a configuration example of an imaging system according to a sixth embodiment.
Figure 9B:
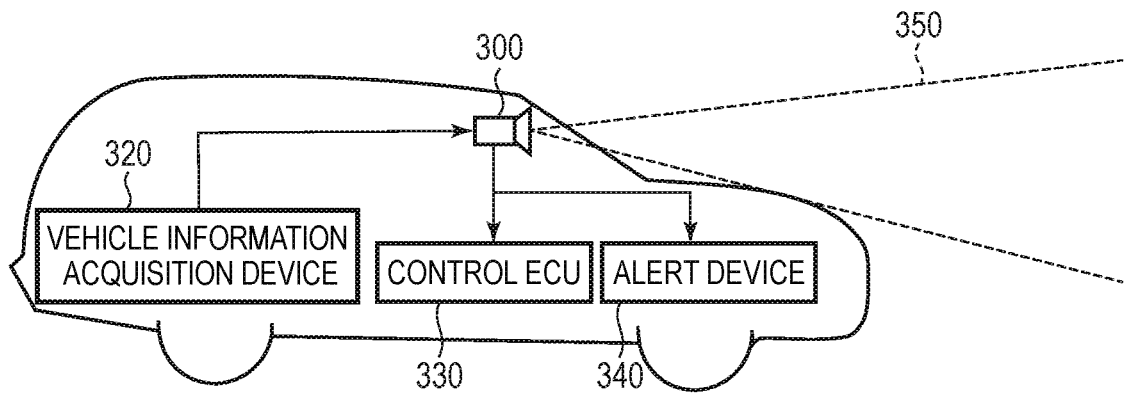
FIG. 9B is a diagram illustrating a configuration example of a movable object according to the sixth embodiment.

An imaging system and a movable object according to a sixth embodiment will be described with reference to FIG. 9A and FIG. 9B. FIG. 9A is a diagram illustrating a configuration of the imaging system according to the present embodiment. FIG. 9B is a diagram illustrating a configuration of the movable object according to the present embodiment.

FIG. 9A illustrates an example of an imaging system related to an on-vehicle camera. An imaging system 300 includes an imaging device 310. The imaging device 310 is the photoelectric conversion device 100 described in any of the above first to fourth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 9B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The disclosure is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments.

Further, although the state where the amplification factor of a pixel signal output by the amplifiers 34 and 36 is small is defined as a state of the low gain and the state where the amplification factor of a pixel signal output by the amplifiers 34 and 36 is large is defined as a state of the high gain in the embodiment described above, the states of the low gain and the high gain are not limited to such a combination. For example, the gain of a pixel signal can also be controlled by a value of the FD capacitance. When the control signal FDinc is controlled to the high level to connect the load capacitor CFD to the floating diffusion portion FD, the FD capacitance increases, and the gain of the pixel signal decreases. Therefore, a case where the control signal FDinc is set to the high level may be defined as the state of the low gain, and a case where the control signal FDinc is set to the low level may be defined as the state of the high gain. Further, a configuration that can adjust the gain at the amplifier 34, for example, a configuration that can switch the capacitance of the feedback capacitor Cf of the amplifier 34 may be employed. The states of the low gain and the high gain may be defined by any combination of gain control using the floating diffusion portion FD and gain control using the amplifier 34 or 36.

Further, although the configuration including the two photoelectric converters PDA and PDB and the two transfer transistors M1A and M1B as the pixel 12 forming the pixel region 10 has been described as an example in the above embodiments, the configuration of the pixel 12 is not limited thereto. For example, one or three or more photoelectric converters PD and one or three or more transfer transistors M1 may be included in each of the pixels 12. Further, a holding portion that holds charge may be added in addition to the photoelectric converter PD and the floating diffusion portion PD to form a pixel configuration that is applicable to a global electronic shutter operation. Further, a discharging transistor used for discharging charge of the photoelectric converter PD may be further added.

Further, although an AD conversion process of a pixel signal is performed in the readout circuit unit 30 of the photoelectric conversion device 100 in the first to third embodiments described above, a pixel signal may be output as an analog signal from the photoelectric conversion device 100, and an AD conversion process may be performed outside the photoelectric conversion device 100.

Further, the imaging systems illustrated in the above fifth and sixth embodiments are examples of an imaging system to which the photoelectric conversion device of the disclosure may be applied, and an imaging system to which the photoelectric conversion device of the disclosure can be applied is not limited to the configuration illustrated in FIG. 8 and FIG. 9A.

Embodiments of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-197632, filed Oct. 30, 2019, which is hereby incorporated by reference herein in its entirety.

What is claimed is:

1. A photoelectric conversion device comprising:
a plurality of pixels arranged to form a plurality of rows and a plurality of columns and each including a photoelectric converter;
an amplifier unit configured to amplify, at a plurality of gains, a signal in accordance with an amount of charge generated by the photoelectric converter of each of the pixels;
a plurality of signal holding capacitors provided in association with the plurality of columns and each configured to hold the signal amplified by the amplifier unit;
a plurality of switches provided in association with the plurality of columns and each configured to control a sample-and-hold operation of the signal to each of the signal holding capacitors on a corresponding column; and
a control unit that supplies a control signal that controls operations of the plurality of switches,
wherein the control unit
supplies the control signal whose settling time when the plurality of switches transition from an on-state to an off-state is a first length when the signal amplified by the amplifier unit at a first gain is held in each of the signal holding capacitors, and
supplies the control signal whose settling time when the plurality of switches transition from an on-state to an off-state is a second length, which is shorter than the first length, when the signal amplified by the amplifier unit at a second gain, which is higher than the first gain, is held in each of the signal holding capacitors.

2. The photoelectric conversion device according to claim 1, wherein a length of a period in which the plurality of switches are in an on-state when the signal amplified at the second gain is held in each of the signal holding capacitors is longer than a length of a period in which the plurality of switches are in an on-state when the signal amplified at the first gain is held in each of the signal holding capacitors.

3. The photoelectric conversion device according to claim 1, wherein in the control signal, a settling time when the plurality of switches transition from an on-state to an off-state is longer than a settling time when the plurality of switches transition from an off-state to an on-state.

4. The photoelectric conversion device according to claim 1,
wherein the control unit
includes a buffer circuit that includes an inverter circuit having a node on a higher voltage power supply side, a node on a lower voltage power supply side, and an output node that outputs the control signal and a current source connected between the node on the lower voltage power supply side of the inverter circuit and a power supply on a lower voltage side,
sets the current source to a first current value when holding the signal amplified at the first gain to each of the signal holding capacitors, and
sets the current source to a second current value, which is larger than the first current value, when holding the signal amplified at the second gain to each of the signal holding capacitors.

5. The photoelectric conversion device according to claim 1 further comprising a common control line used for supplying the control signal from the control unit to the plurality of switches.

6. The photoelectric conversion device according to claim 1, wherein the amplifier unit includes a plurality of column amplifier units provided in association with the plurality of columns and each configured to amplify a signal output from the pixels on a corresponding column.

7. The photoelectric conversion device according to claim 6, wherein each of the plurality of column amplifier units includes a plurality of amplifiers and is configured to switch the gain in accordance with the number of stages of the amplifiers to be used.

8. The photoelectric conversion device according to claim 6 further comprising:
a plurality of second switches provided in association with the plurality of columns and each configured to control a reset operation of each of the column amplifier units on a corresponding column; and
a second control unit that supplies a second control signal that controls operations of the plurality of second switches,
wherein the second control unit supplies the second control signal whose settling time when the plurality of second switches transition from an on-state to an off-state is longer than settling time when the plurality of second switches transition from an off-state to an on-state.

9. The photoelectric conversion device according to claim 8 further comprising a common second control line used for supplying the second control signal from the second control unit to the plurality of second switches.

10. The photoelectric conversion device according to claim 1 further comprising:
a plurality of comparators provided in association with the plurality of columns and each configured to compare the signal amplified by the amplifier unit with a reference signal;
a plurality of third switches provided in association with the plurality of columns and each configured to control a reset operation of each of the comparators on a corresponding column; and
a third control unit that supplies a third control signal that controls operations of the plurality of third switches,
wherein the third control unit supplies the third control signal whose settling time when the plurality of third switches transition from an on-state to an off-state is longer than settling time when the plurality of third switches transition from an off-state to an on-state.

11. The photoelectric conversion device according to claim 10 further comprising a common third control line used for supplying the third control signal from the third control unit to the plurality of third switches.

12. The photoelectric conversion device according to claim 1, wherein the amplifier unit includes amplifier circuits each provided to each of the plurality of pixels.

13. The photoelectric conversion device according to claim 12,
wherein each of the amplifier circuits includes
a capacitor that holds charge transferred from the photoelectric converter,
a capacitance switching unit that switches a capacitance of the capacitor, and
an amplifier transistor that outputs a signal in accordance with an amount of charge transferred from the photoelectric converter and the capacitance of the capacitor.

14. A method of driving a photoelectric conversion device including a plurality of pixels arranged to form a plurality of rows and a plurality of columns and each including a photoelectric converter, an amplifier unit configured to amplify, at a plurality of gains, a signal in accordance with an amount of charge generated by the photoelectric converter of each of the pixels, a plurality of signal holding capacitors provided in association with the plurality of columns and each configured to hold the signal amplified by the amplifier unit, and a plurality of switches provided in association with the plurality of columns and each configured to control a sample-and-hold operation of the signal to each of the signal holding capacitors on a corresponding columns, the method comprising:
driving the plurality of switches by the control signal whose settling time when the plurality of switches transition from an on-state to an off-state is a first length when the signal amplified by the amplifier unit at a first gain is held in each of the signal holding capacitors; and
driving the plurality of switches by the control signal whose settling time when the plurality of switches transition from an on-state to an off-state is a second length, which is shorter than the first length, when the signal amplified by the amplifier unit at a second gain, which is higher than the first gain, is held in each of the signal holding capacitors.

15. An imaging system comprising:
the photoelectric conversion device according to claim 1; and
a signal processing unit that processes a signal output from the photoelectric conversion device.

16. A movable object comprising:
the photoelectric conversion device according to claim 1;
a distance information acquisition unit that acquires distance information on a distance to an object, from a parallax image based on signals from the photoelectric conversion device; and
a controlling unit that controls the movable object based on the distance information.

* * * * *